United States Patent [19]

Migliaccio

[11] Patent Number: 5,304,791
[45] Date of Patent: Apr. 19, 1994

[54] APPARATUS FOR DETECTING HIGH SPEED EVENTS

[75] Inventor: Richard A. Migliaccio, Copiague, N.Y.

[73] Assignee: Ail Systems, Inc., Deer Park, N.Y.

[21] Appl. No.: 919,136

[22] Filed: Jul. 23, 1992

[51] Int. Cl.$^5$ ............................................. H01T 40/14
[52] U.S. Cl. ............................ 250/214 VT; 348/230; 348/299; 348/359
[58] Field of Search .................... 250/208.1, 214 VT; 257/443; 358/213.13, 213.26, 213.29, 213.31, 213.23, 213.27; 377/58, 62, 63

[56] References Cited

U.S. PATENT DOCUMENTS 4,282,427 8/1981 Brjukhnevich et al. ...... 250/214 VT
4,827,346 5/1981 Hicks, Jr. ..................... 250/214 VT

OTHER PUBLICATIONS

Y. A. Carts, "Imaging system detects indirect laser light" *Laser Focus World*, Aug. 1992, pp. 37-38.

*Primary Examiner*—David C. Nelms
*Assistant Examiner*—K. Shami
*Attorney, Agent, or Firm*—Hoffmann & Baron

[57] ABSTRACT

A photon emitting high speed event detector provides for the optimum detection and location of high speed events such as strobe light sources, pulsed laser, gunfire, and lightning. The detector includes a focal plane array, a control circuit and a cueing sensor. The focal plane array is capable of receiving and storing photons which are emitted from a device. The focal plane array is continuously switched by the control circuit between an integrate (charging) and non-integrate (clearing) state until a high speed event is detected by the cueing sensor. During the charging state, incident photon energy is stored by the focal plane array. Upon detection of an event, the cueing sensor instructs the control circuit to hold the focal plane array in the integrate state and the control circuit reads out the stored charge which can be provided to a video monitor for display.

14 Claims, 6 Drawing Sheets

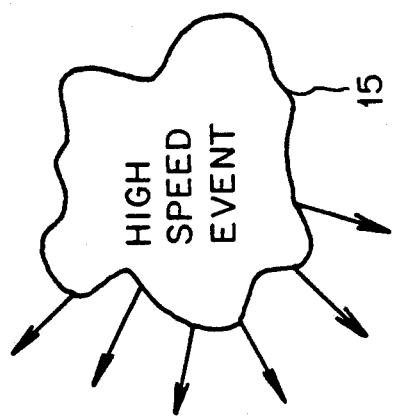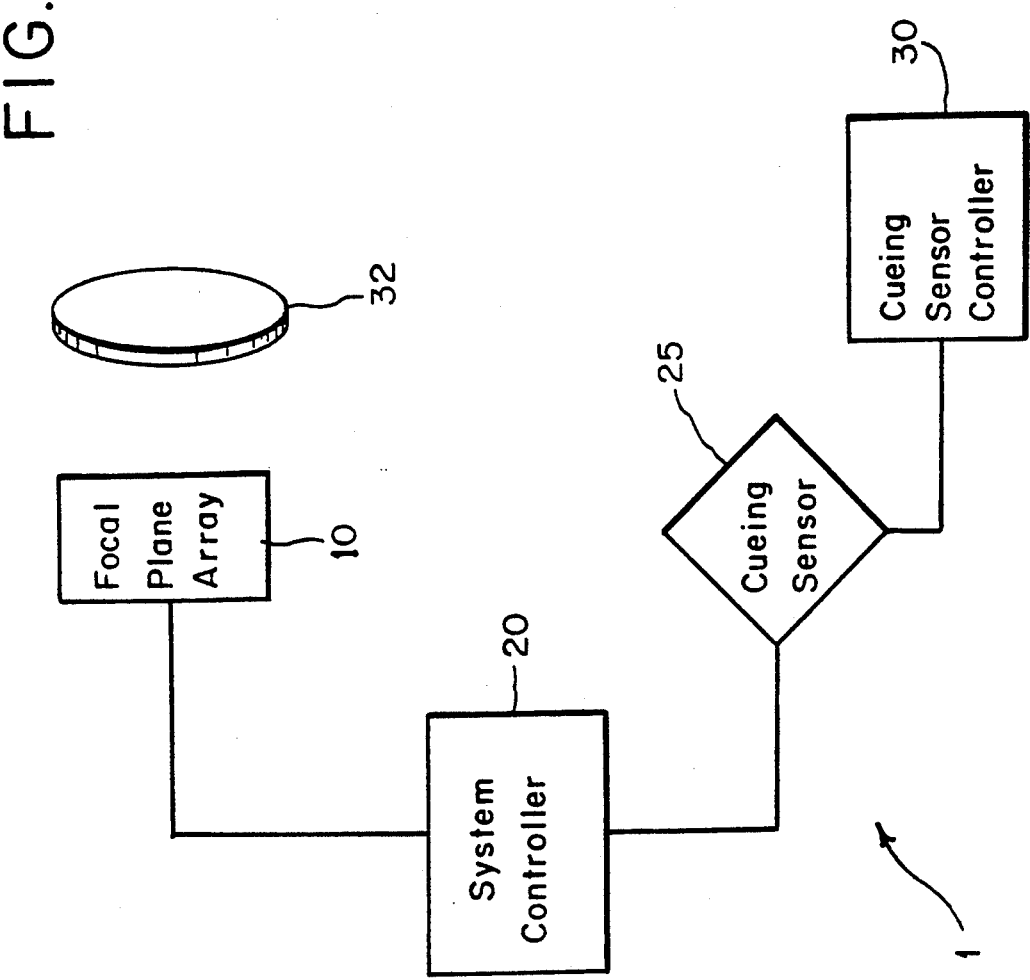
FIG. 1

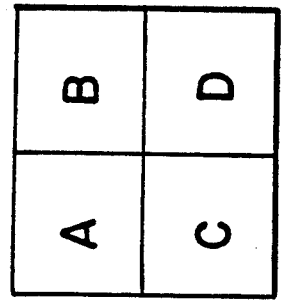
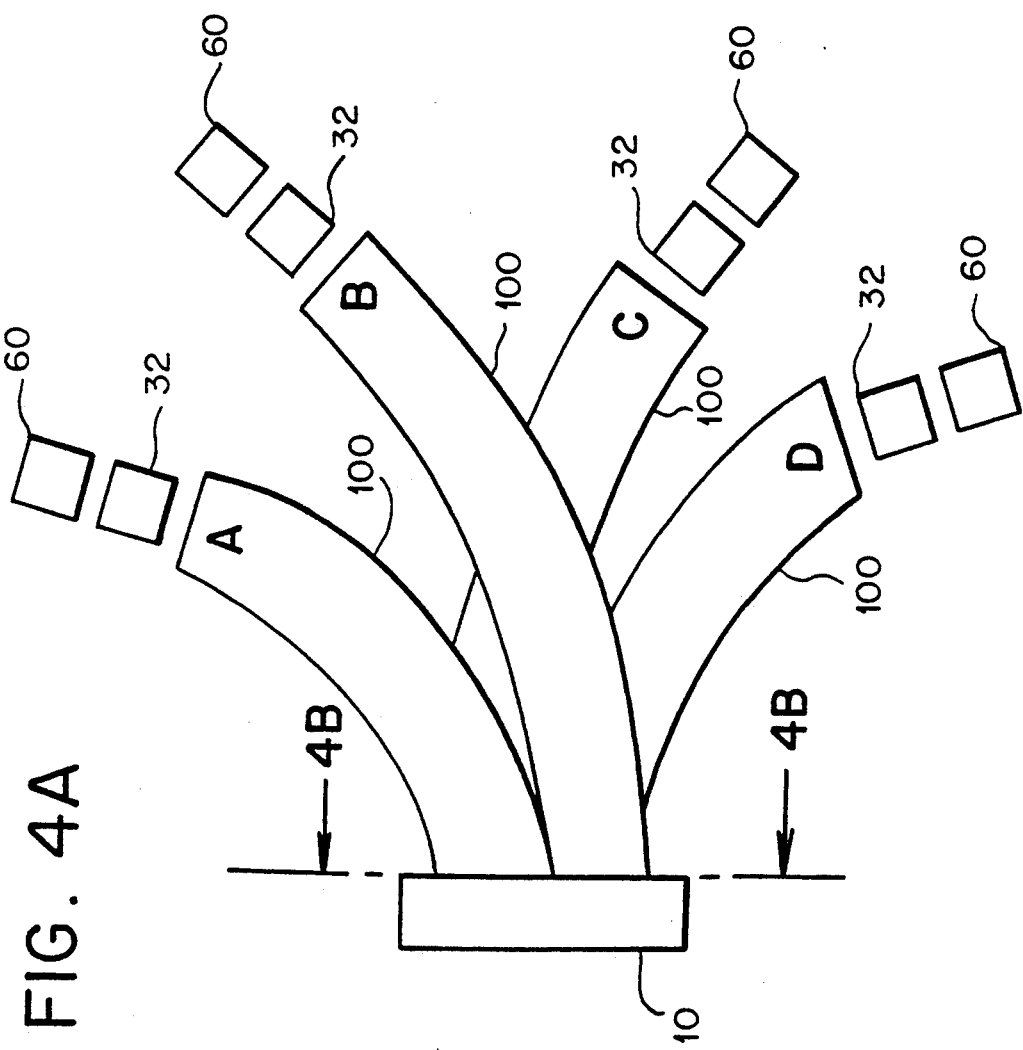

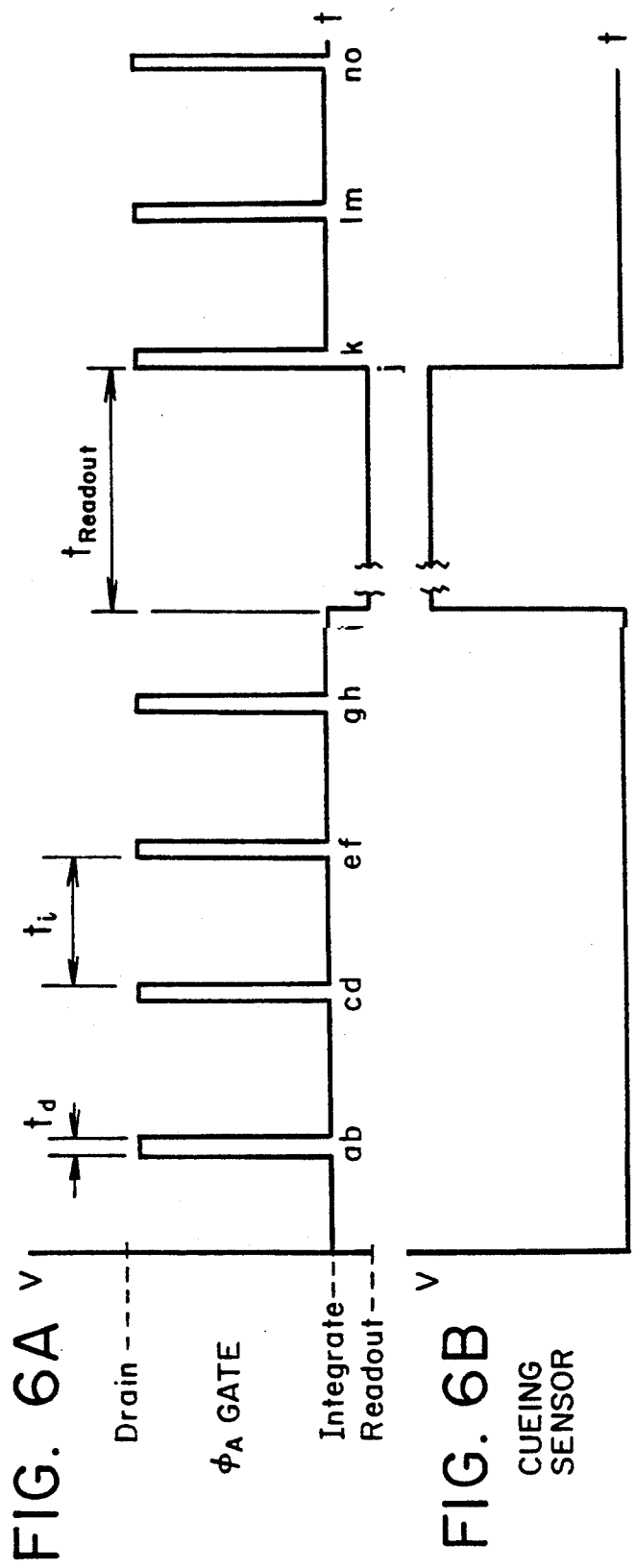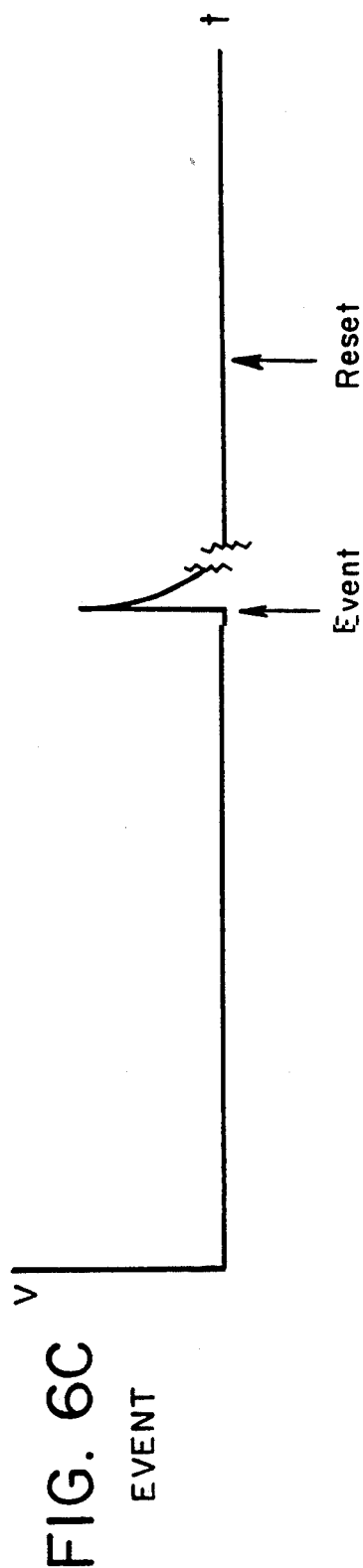

APPARATUS FOR DETECTING HIGH SPEED EVENTS

BACKGROUND OF THE INVENTION

1. Field of the Invention

The present invention relates to the detection of high speed events and more particularly relates to detecting and locating photon emitting high speed events using a charge coupled device focal plane array.

2. Description of the Prior Art

High speed events have traditionally been detected with gated image tubes, camera tubes and streak camers which utilize charge coupled devices (CCD). It is also known that high speed events can be detected using a cueing sensor, a focal plane array and an optical delay line wherein the cueing sensor is coupled to a gate of the focal plane array in order to control the current state of the focal plane array. The gate is used to hold the focal plane array in a non-integrating (non-charging or drain) state until the cueing sensor detects a photon emitting high speed event. Upon detection of such an event, the gate of the focal plane array receives an electrical signal from the cueing sensor which switches the focal plane array to a second state called the integrate (charging) state. The optical delay line is utilized to delay presentation of the high speed event to the focal plane array until the focal plane array is switched from the non-integrating state to the integrate state. In order for the system to operate properly, the optical delay line must provide a delay at least equal to the sum of the cueing sensor response time and the focal plane array non-integrate (drain) to integrate (charging) switching time before the photons from the high speed event are presented to the focal plane array. As a result, the focal plane array will become active before the photons from the high speed event encounter the focal plane array. Therefore, the focal plane array is capable of recording and integrating the high speed event.

Using an optical delay line to assist in the recognition and delay the presentation of high speed events provides a relatively high probability of detecting an event. However, this method is inadequate in several respects. Fiber optic bundles are generally bulky, costly and, have significant optical attenuation on the order of approximately 20 dB which significantly effects the probability of detecting a high speed event. The optical attenuation is attributed to the length of fiber required to achieve the necessary delay for proper operation. Furthermore, the fiber optic bundles often degrade the image quality presented to the focal plane array. Broken fibers and dead zones due to the inefficient packing of the fibers introduce voids into the field of vision, which although small, can reduce the probability of detecting a photon emitting high speed event.

Standard high speed event detection systems using CCD's integrate scene photon radiation approximately 60 times/sec (16 msec intervals) with integration times of 1.0 msec to 16.7 msec with a low probability of intercept (i.e., at 1.0 msec). Due to this relatively long integration time, a significant amount of background light may accumulate on the focal plane array which can clutter a scene with unwanted charge. As a result, it is often difficult to detect a fast temporal photon emitting source from the unwanted charge which has been allowed to accumulate or integrate on the focal plane array.

OBJECTS AND SUMMARY OF THE INVENTION

It is an object of the present invention to provide an apparatus for detecting and locating high speed events.

It is another object of the present invention to provide an apparatus for detecting and locating high speed events which reduces the accumulation of background signals which effect the sensitivity of the apparatus.

It is a further object of this invention to provide apparatus which can detect photon emitting high speed events without the need for background frame-to-frame subtraction.

It is yet another object of the present invention to provide a focal plane array which utilizes a unique clocking method in order to detect high speed events.

It is still another object of the present invention to provide an apparatus which overcomes the inherent disadvantages of known high speed event detection systems which utilize charge coupled devices.

In accordance with one form of the present invention, apparatus for detecting high speed events includes a focal plane array, a system controller and a cueing sensor.

The focal plane array is utilized to temporarily store incident light radiation which is in the focal plane array's field of view. The focal plane array is situated in a specific orientation so that photons emitted from an unknown device, even if operating at a high speed, can charge the plurality of detector elements which make up the focal plane array. The focal plane array can be in one of three operating states, an integrate (charging) state, a non-integrate (drain) state or a readout state. The input of the focal plane array is coupled to the system controller which provides a control signal. The control signal cyclically determines in which of the above-identified states the focal plane array will be operating. During a first portion of the cycle, the system controller instructs the detector elements of the focal plane array to accumulate light energy which is incident on the focal plane array. During the second portion of the operating cycle, the system controller instructs the focal plane array to quickly release or discharge the incident light energy that the detector elements have accumulated. The time required for the detector elements to discharge the incident light energy is a relatively small portion of the total cycle time. The system controller continually repeats this cycle of instructing the focal plane array to store incident charge and then drain the charge that was stored until a photon emitting high speed event is detected by the cueing sensor.

Coupled to the system controller is the cueing sensor which monitors the same field of view as the focal plane array. The cueing sensor is constructed of a plurality of detector elements and provides a detection signal to the system controller when a photon emitting high speed event is recognized. The system controller in turn provides the detection signal to the array in order to maintain the integrate state of the focal plane array while the charge that has accumulated is read out. After the read out process is complete, the focal plane array is reset (i.e., accumulated charge is released) and the integrate/drain cycle is restarted. The image which was read out of the focal plane array can be processed and provided to a video monitor in order to visually determine the location of the high speed event and other spectral or temporal information.

A preferred form of the imaging of high speed events using a charge coupled device focal plane array, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 1 is a block diagram of one form of the apparatus of the present invention for detecting high speed events using a charge coupled device focal plane array.

FIG. 4A is a diagram of a focal plane array used in the present invention having fiber optic bundles coupled thereto.

FIG. 4B is a cross-sectional view of the focal plane array taken along line 4B—4B and showing the regional connections of each fiber optic bundle to a corresponding portion of the focal plane array.

FIG. 6A, 6B, and 6C are a timing diagrams of the focal plane array, the cueing sensor and the occurrence of a high speed event.

DETAILED DESCRIPTION OF THE PREFERRED EMBODIMENTS

Figure 2:
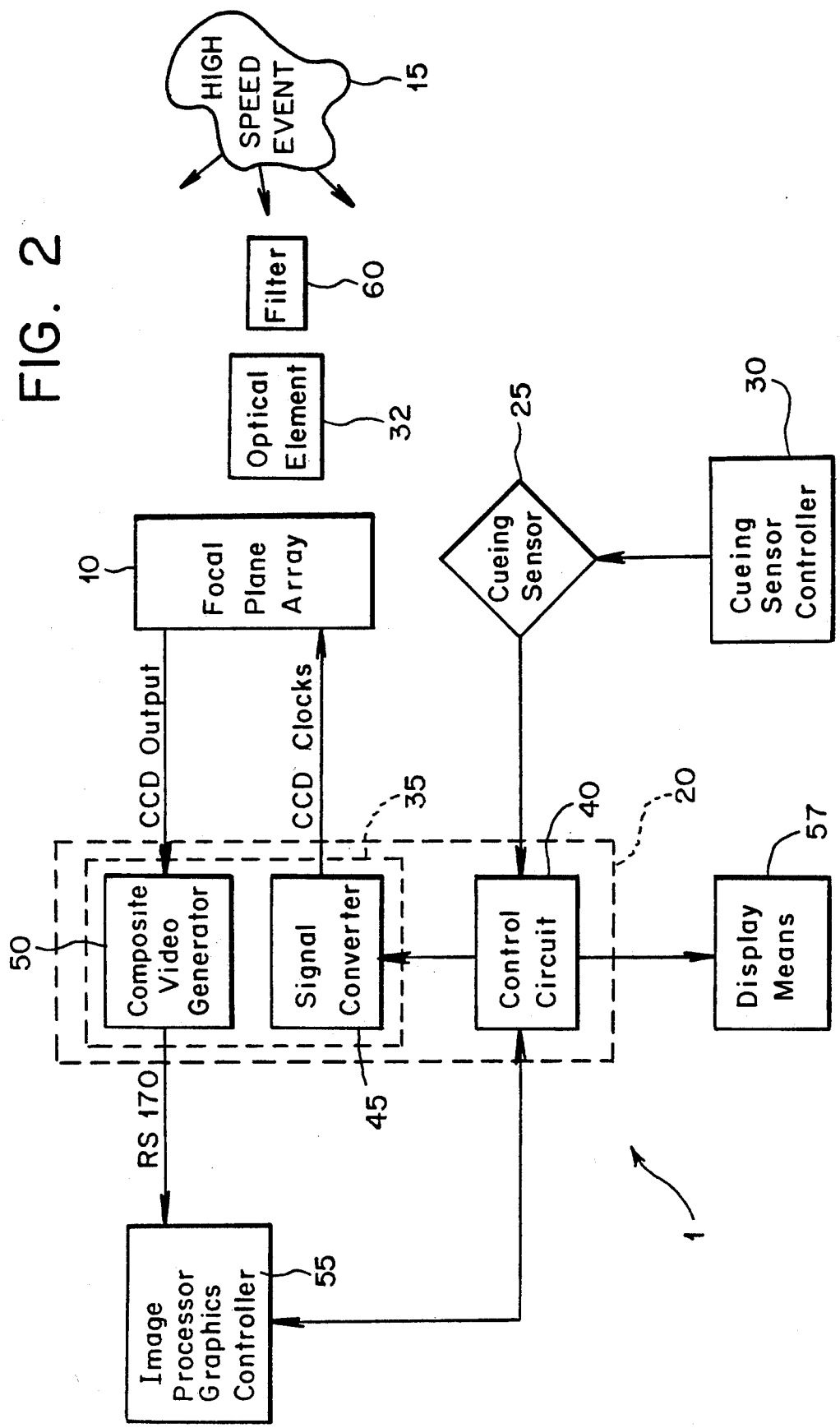
FIG. 2 is a block diagram of a second form of the apparatus of the present invention for detecting high speed events using a charge coupled device focal plane array.

Referring now to FIG. 1 of the drawings, an apparatus for detecting high speed events 1 constructed in accordance with the present invention will now be described. The apparatus shown in FIG. 1 provides for the optimum detection and location of high speed events such as strobe light sources, pulsed lasers, gunfire and lightning while at the same time eliminating the collection of background photons which can clutter the image of a high speed event.

The apparatus for detecting high speed events 1 includes a focal plane array 10 which is capable of receiving and storing photons, even if the emitting device such as a pulsed laser, operates at high speeds. The focal plane array is made up of a one or two dimensional matrix of detector elements which are used to acquire the irradiated light of a high speed event 15. Coupled to the focal plane array is a system controller 20. The system controller regulates the operation of the focal plane array by providing a timing signal and other control signals. Coupled to the system controller is a cueing sensor 25 which is made up of one or more detector elements which detect and notify to the system controller when a high speed event has occurred. Coupled to the cueing sensor is a cueing sensor controller 30 which provides an instruction signal to the cueing sensor. The cueing sensor controller signal directs the cueing sensor as to the wavelength of incident light the cueing sensor should detect (for example, within a specific pulse width time window) before providing a detection signal to the system controller. This permits the system to trigger only upon the detection of specific events. The apparatus may also include an optical element 32 such as an input lens designed to focus and concentrate the incident photons upon the focal plane array.

The system controller 20 of this invention is designed to cyclically turn on and turn off the focal plane array 10 so that it will "integrate" or store incident photons and discharge or "drain" the focal plane array when the integrate portion of the cycle has ended. Upon detection of a high speed event having a proper wavelength of light, the system controller instructs the focal plane array to read out the accumulated charge.

Referring now to FIG. 2 of the drawings, an alternative form of the high speed event detector 1 will be described. The device includes the focal plane array 10 as described with regard to FIG. 1. Coupled to the focal plane array is the system controller 20 which includes a pre-processing element 35 and a control circuit 40. The pre-processing element functions as a buffer memory between the focal plane array and the control circuit. The pre-processing element also functions as a buffer between the focal plane array and an image processor/graphics controller 55. The pre-processing element has two components therein, a signal converter 45 and a composite video generator 50. One function of the signal converter portion of the pre-processing element is to convert the control circuit signals to a form which is intelligible to the focal plane array. In a preferred embodiment, the pre-processing element converts the TTL level signals provided by the control circuit to a level which is compatible to the MOS circuitry of the focal plane array. A suitable TTL/MOS signal converter for use as a component of the pre-processing element is part no. TH7995 manufactured by Thomson Components of France. The pre-processing element also includes a composite video generator 50 which receives the focal plane array output signals and converts these signals from MOS level signals to RS-170 video level signals. A suitable composite video generator for use as a portion of the pre-processing element is part no. TH7992, also manufactured by Thomson Components of France.

The control circuit 40 of the present invention regulates the operation of the focal plane 10 array by providing timing signals and other control signals which instruct the focal plane array to charge, discharge and read-out the accumulated charge.

As shown in FIG. 2, the high speed event detector may also include an image processor/graphics generator 55 coupled to the composite video generator 50 of the pre-processing element 35. The image processor/graphics generator is designed to receive the RS-170 video level signal provided by the composite video generator of the pre-processing element. The image processor/graphics generator determines the direction of arrival (DOA) of the high speed irradiating source from the RS-170 video signal and displays this information in conjunction with the scene that the focal plane array has detected. The image processor provides an image data signal to the control circuit which provides the generated image data to a display means for viewing or further analysis by a system operator.

The function of the image processor/graphics generator 55 is to process the video level signal produced by the composite video generator 50 to determine the DOA of the source. The image processor will add this DOA to a running list of DOA occurrences stored in a memory device. This list will store up to six of the most recent DOA occurrences. A DOA will be deleted from this list if it has been stored for over 10 seconds or if six more recent DOA hits have been registered. The image processor/graphics generator subsystem will utilize the information from this list to generate a video signal for a display unit. The video signal is provided to the control circuit 40 which in turn provides the signal to the display unit 57. The video signal will have, for each DOA occurrence, a symbol, large enough to be seen by the operator, positioned at the point of the scene of the display unit corresponding to the DOA and text indicating the address of this point. This symbol can be a cross hair pattern whose exact shape will be determined during system integration. The display unit is used to relay all this information to the operator.

Coupled to the control circuit 40 of the system controller 20 is the cueing sensor 25. The cueing sensor can be selectively set by a cueing sensor controller 30 so that the cueing sensor can discriminate between the various wavelengths which it is capable of perceiving and select a specific wavelength to process. As previously described, the cueing sensor will monitor the same field of view as the focal plane array in order to determine when a high speed event having the desired wavelength has occurred. Once a proper high speed event is detected by the cueing sensor, a cueing sensor signal is provided to the control circuit which in turn forwards the cueing sensor signal to the TTL/MOS signal converter 45 before it is transferred to the focal plane array 10.

As shown in FIG. 2, the high speed event detector may also include spectral filters 60 such as a balancing filter or a spectral band pass filter in order to normalize the responsitivity of the CCD, (i.e, Schott color glass filters (UG-3, VG-4) and V5 micron custom filters) and an optical element 32, such as an input lens designed to focus and concentrate the incident photons upon the focal plane array 10. Preferably, the optical element, which can be an off-the-shelf input lens, such as a Schneider f/1.4 17.9 focal length CCTV lens, preferably operates at an aperture setting of f/10. This provides a diffraction limited spot of 24 microns. The optical element lens should be selected to operate with a Charge Coupled Device (CCD) camera and color corrected in the 0.4 to 1.1. micron band. Operating the lens at an aperture setting of f/10 further minimizes the effects of chromatic aberrations since its depth of focus is now larger. The 17.9 mm focal length in conjunction with a properly selected focal plane array such as 8.8 mm AZ (azimuth) X 6.6 mm EL (elevation) will provide a field of view of 27.5 degrees AZ X 20.7 EL.

Figure 3:
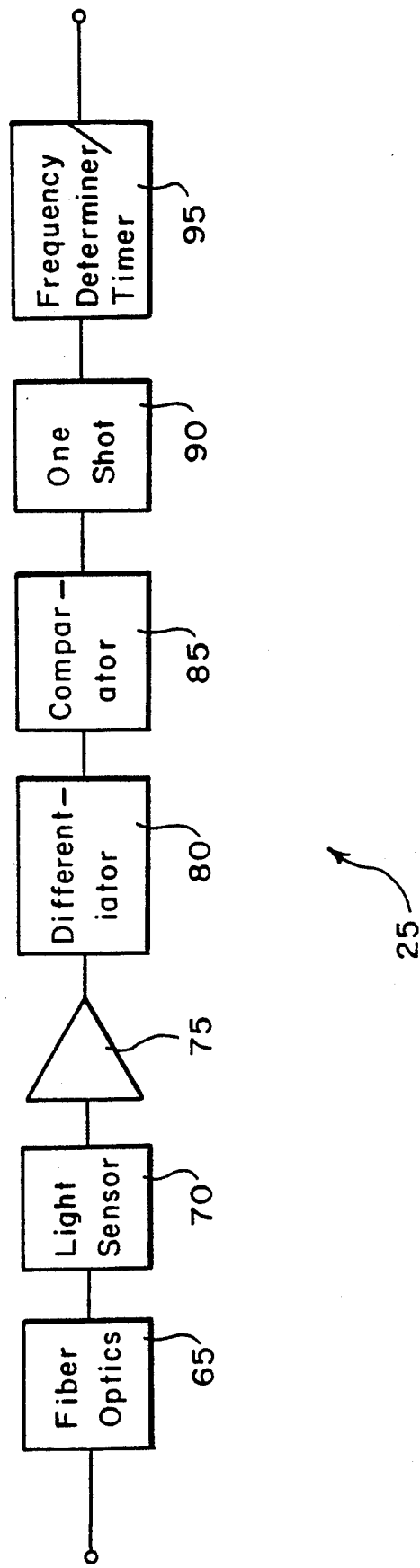
FIG. 3 is a block diagram of the cueing sensor used in the present invention for detecting high speed photon emitting events.

Referring now to FIG. 3, one form of the cueing sensor 25 is shown which uses temporal discrimination to distinguish different sources of photon energy. The cueing sensor measures the pulse width of a received signal. The cueing sensor analyses the received signal and provides a cueing sensor detection signal only when the incident light has a desired pulse width. If the incident light does not have the desired pulse width, the incident light is declared a non-event. However, if the incident light has the desired pulse width, the event is recognized and a cueing sensor signal is provided to the control circuit 40. Alternatively, the cueing sensor can utilize spectral discrimination by placing a spectral filter 60 in front of the light sensor as shown in FIG. 2.

As shown in FIG. 3, the cueing sensor as used in the present invention includes a fiber optic bundle 65 coupled to a high speed light sensor 70 which is capable of generating a light sensor output signal in response to the incident light. In the preferred embodiment, the fiber optic bundle functions as a beam splitter and guides the incident light toward the high speed light sensor. One end of the fiber optic bundle may be formed into a square shape and serve as a light collection area. Preferably, the fiber optics are then split into circular bundles which may be placed over each individual light detector which comprise the high speed light sensor. It is preferred that the fiber optic bundles be randomly connected to the high speed light sensor to ensure that the incident light is uniformly sent to all light detectors.

A suitable high speed light sensor 70 which may be used is Part No. YAG444 manufactured by EG&G of Salem, Mass. Coupled to the high speed light sensor is an amplifier 75 for increasing the strength of the light sensor output signal. Alternately, the light exiting the fiber optic bundle can be provided to a light sensor comprised of photodiodes having an integral high speed amplifier such as Part No. HFD-1100 manufactured by EG&G.

The amplifier 75 of the cueing sensor provides an output signal, consisting of a pulse, to a differentiator 80 which differentiates the amplifier output signal. The differentiator may be in the form of an R-C filter. The differentiated signal, which consists of a positive and negative pulse, is provided to a comparator circuit 85 which contains a preset threshold value. The differentiated output signal is then compared against the comparator preset threshold value which is utilized in determining the pulse width of the incident light. The comparator will send an indicator signal to a monostable device 90 (i.e., one shot device), such as Part No. LM555 manufactured by National Semiconductor Corporation of California, when the differentiated signal is above or equal to the preset threshold value. In addition, the comparator will not provide an indicator signal when the differentiated signal is below the preset threshold value. Coupled to the monostable device is a timer 95 which converts the output of the monostable device to a measurement of the pulse width of the incident light. The timer is designed so that if the pulse width of the incident light is within a specified range, a cueing sensor output signal will be provided by the timer. The cueing sensor output signal indicates that the incident light of the high speed event as detected by the cueing sensor has a pulse width characteristic which is within the acceptable window set by the cueing sensor controller.

The operation of the comparator 85, monostable device 90 and timer 95 can be described as follows. As previously stated, the output signal of the differentiator 80 provides a positive and negative pulse to the comparator circuit 85. These pulses are separated in time by the pulse width of the original signal. The positive pulse triggers a first comparator which is included in comparator circuit 85 and which provides a start signal to the timer 95. When the negative pulse triggers a second comparator which is also included in comparator circuit 85, the timer is stopped and the accumulated time is compared against a pre-set value set by the cueing sensor controller 30. If the time reading on the timer falls within the pre-set time window, a proper event is recognized and so indicated by the output signal from the timer 95.

Referring now to FIG. 4A, the high speed event detector 1 may also include a plurality of coherent fiber optic bundles 100 coupled to the face of the focal plane array 10. The plurality of coherent fiber optic bundles can be positioned so that each fiber optic bundle has a different field of view in order to monitor a larger viewing area. Specifically, the fiber optic bundles 100 are separated into spaced-apart branch bundles A-D extending from the main fiber optic bundle 100 at different angles to provide different fields of view. Each bundle A-D, corresponding to a different field of view, can be coupled and imaged in different sections of one focal plane array as shown in FIG. 4B. At the end of each fiber optic bundle, a spectral filter 60 and/or an optical element 32 may be positioned in order to focus the incident light as previously described with regard to FIG. 2.

Figure 5:
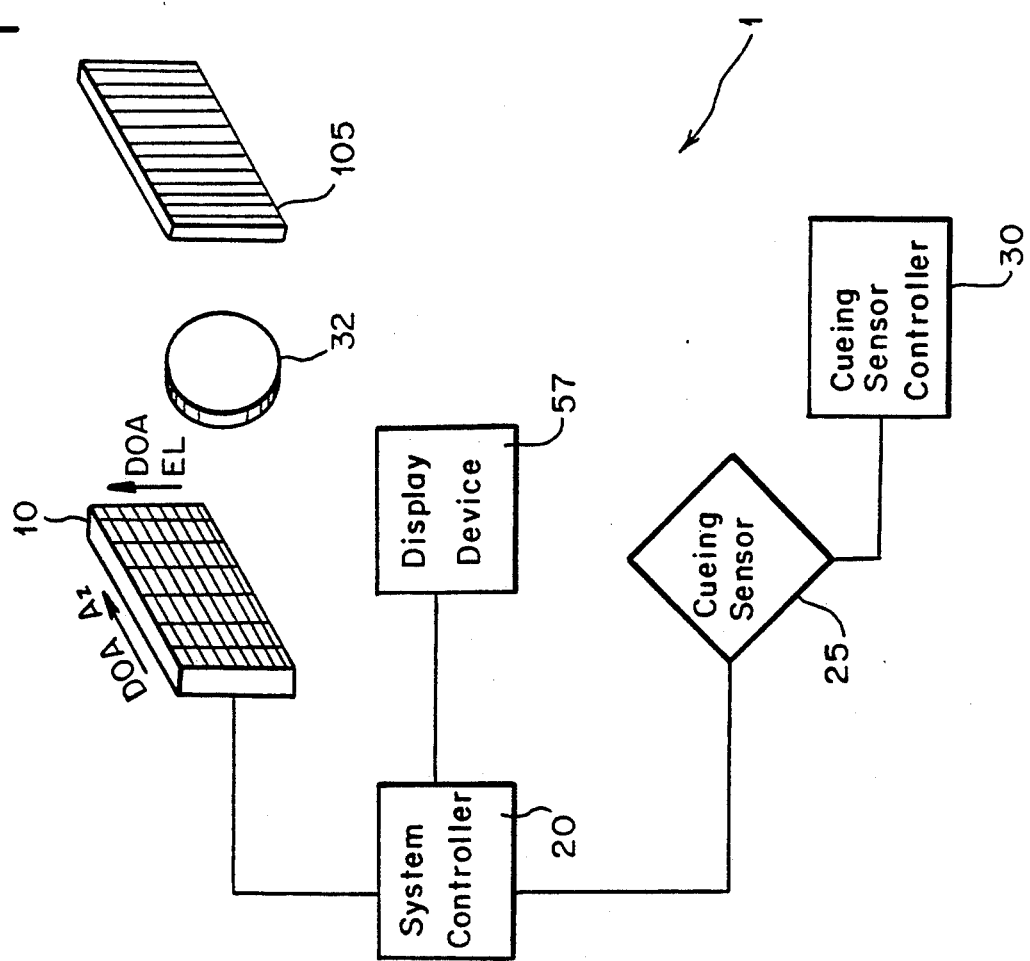
FIG. 5 is a diagram of a third form of the apparatus of the present invention for detecting high speed events using a charge coupled device focal plane array.

Referring now to FIG. 5, an alternative from of the high speed event detector will be described. The device includes the cueing sensor controller 30, cueing sensor 25, system controller 20, focal plane array 10 and input lens 32 as described with regard to FIGS. 1 and 2. The high speed event detector 1 of FIG. 5 also includes a light grating 105 located between the input lens 32 and the high speed event 15. The light grating preferably consists of a plurality of equally spaced similar slits which allow light to pass through. The combination of the light grating and the input lens provides a direction of arrival (DOA) in the azimuth of the high speed event across the horizontal axis of the focal plane array and the direction of arrival (DOA) in the elevation of the high speed event along the vertical axis of the focal plane array. This information can then be processed by the system controller 20 and image processor/graphics generator 55 and displayed on the display unit 57 as described with regard to FIG. 2.

Alternatively, the high speed event detector can include a partition, having a vertical slit which allows light to pass, located between the input lens 32 and the focal plane array 10. With this configuration, the focal plane array will provide spectral discrimination along a first axis and direction of arrival (DOA) along a second axis.

Referring now to FIG. 6, the operation of the high speed photon detector will now be described. The Thomson TH7866 CCD focal plane array has the unique feature that the integration/non-integration time can be controlled through a gate ($\phi$A gate) of the device. This gate acts as a barrier between each pixel of the device and a charge sink diode which clears each pixel of the stored charge. When the $\phi$A gate is in its high voltage DRAIN state, all charge accumulated on the focal plane array will be dumped into the charge sink. When the $\phi$A gate is in its mid-voltage INTEGRATE state, charge can be integrated on the focal plane array and excess charge will be dumped into the sink diode. In order to read charge from the focal plane array, the $\phi$A gate must be in its low-voltage READOUT state.

FIG. 6 shows timing diagrams of the $\phi$A gate, the cueing sensor and the occurrence of an event. Referring to FIG. 6A, it can be seen that the $\phi$A gate controls the integrate, drain and readout states of the focal plane array. During the time interval a-b, charge that was stored in the focal plane array is cleared or drained by the high voltage DRAIN state of the $\phi$A gate. Thereafter, when the $\phi$A signal drops to a lower voltage INTEGRATE state (i.e., during time interval b-c), the focal plane array is permitted to store incident light energy as a charge. This cycle of integrating and draining the focal plane array continues until an event occurs that is detected by the cueing sensor such as at time i.

Upon the occurrence of an event at time i, the cueing sensor detects the event and informs the focal plane array through the system controller and the $\phi$A gate that an event has been perceived. The $\phi$A gate is then set to its low-voltage READOUT state at time i wherein the stored charge of the focal plane array is read out and provided to the pre-processing element 35 as described with regard FIG. 2. After all of the charge has been read out of the focal plane array and provided to the pre-processing element, the control circuit resets the cueing sensor and the focal plane array so that the next high speed event can be detected.

In view of the above described charging and draining states of the focal plane array, it is evident that the probability of intercepting a high speed event is dependent upon the focal plane array integration time and the focal plane array drain time as follows:

$$\text{Probability of Intercept} = \frac{\text{integration time}}{\text{total cycle time}}$$

If the reset time is equivalent to 300 nsec. and the integration time is equivalent to 10 $\mu$sec., the probability of intercept P will be:

$$P = \frac{10 \ \mu\text{sec}}{(10 \ \mu\text{sec} + 300 \ \text{nsec.})} = .971$$

However, if the amount of time required for charging the focal plane array is increased to 30 $\mu$sec, then the probability of intercept is 0.990 which is an even more significant improvement over the prior art devices. The integration of 10 $\mu$sec to 30 $\mu$sec represents an effective frame rate of 33 kHz to 100 kHz. This is a dramatic improvement over the conventional integration time control where the integration time can vary between 0.5 to 16.7 msec.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for detecting and locating high speed photon emitting events comprising:
   a) a focal plane array having a plurality of detector elements for accumulating incident photon energy, the focal plane array having an input port which receives an input signal, the focal plane array also having an output port;
   b) a control circuit coupled to the focal plane array, the control circuit providing a control signal to the input port of the focal plane array which regulates the operation of the focal plane array, the control circuit alternately instructing the focal plane array to accumulate incident photon energy and to discharge accumulated photon energy; and
   c) a cueing sensor coupled to the control circuit, the cueing sensor having a plurality of detector elements and generating a cueing sensor detection signal upon detection of a high speed photon emitting event, the cueing sensor detection signal being provided to the control circuit, the cueing sensor detection signal instructing the control circuit to maintain a current state of the focal plane array and to read out the photon energy accumulated by the focal plane array.

2. Apparatus for detecting and locating high speed photon emitting events as defined by claim 1 further comprising:

an optical element substantially located between the focal plane array and the high speed photon emitting event, the optical element being placed at a distance from the focal plane array which is substantially equivalent to the focal length of the optical element.

3. Apparatus for detecting and locating high speed events as defined by claim 1 wherein the focal plane array has two axes, the focal plane array defining an azimuthal direction of arrival along a first axis and an elevational direction of arrival along a second axis, the apparatus further comprising:

a transmission grating located adjacent to the optical element.

4. Apparatus for detecting and locating high speed events as defined by claim 3 wherein the transmission grating is located substantially between the optical element and the high speed event.

5. Apparatus for detecting and locating high speed events as defined by claim 1 wherein the focal plane array has two axes, the focal plane array defining a spectral discrimination along a first axis and a direction of arrival along a second axis, the apparatus further comprising:

a partition having a vertical slit which permits incident light to pass through the partition, the partition located adjacent to the optical element.

6. Apparatus for detecting and locating high speed events as defined by claim 5 wherein the partition is located substantially between the optical element and the focal plane array.

7. Apparatus for detecting and locating high speed photon emitting events as defined by claim 1 further comprising:

a display signal generator coupled to the output port of the focal plane array, the display signal generator receiving a focal plane array output signal and providing a display signal; and display means coupled to the display signal generator, the display means receiving the display signal and providing an image corresponding to the location of the high speed photon emitting event as detected by the focal plane array.

8. Apparatus for detecting and locating high speed photon emitting events as defined by claim 7 wherein the display signal generator signal provides an angle of arrival of the high speed photon emitting event and an updated image of the scene.

9. Apparatus for detecting and locating high speed photon emitting events as defined by claim 1 further comprising:

a signal converter coupled to the control circuit, the signal converter also being coupled to the focal plane array, the signal converter receiving and converting the control signal so that the control signal is compatible with the input signal of the focal plane array.

10. Apparatus for detecting and locating high speed photon emitting events as defined by claim 1 further comprising:

light filter means adjacent to the focal plane array, the light filter means being substantially located between the focal plane array and the high speed photon emitting event, the light filter means eliminating a portion of the light incident on the focal plane array.

11. Apparatus for detecting and locating high speed photon emitting events as defined by claim 1 wherein the cueing sensor can be selectively set in order to discriminate between various high speed photon emitting events.

12. Apparatus for detecting and locating high speed photon emitting events as defined by claim 11 wherein the selective setting of the cueing sensor permits the cueing sensor to set various windows of event duration and to identify spectral characteristics of the high speed photon emitting event.

13. Apparatus for detecting and locating high speed photon emitting event as defined by claim 1 further comprising:

a plurality of fiber optic bundles coupled to the focal plane array, the plurality of fiber optic bundles being positioned so that an end portion of each fiber optic bundle faces in substantially different radial directions so as to provide a wide field of view; and a plurality of imaging lenses proximately positioned in relation to the fiber optic bundle end portions, each of the plurality of imaging lenses facing in substantially different radial directions corresponding to the radial directions of the plurality of fiber optic bundle end portions.

14. A cueing sensor for detecting a high speed photon emitting event comprising:

a) a light sensor which detects the occurrence of a specific photon emitting event by monitoring incident illumination, the light sensor having an output port and generating thereon a light sensor signal indicating the detection of incident illumination;

b) amplifying means coupled to the output port of the light sensor, the amplifying means amplifying the light sensor signal and generating an amplified light sensor signal in response thereto;

c) differentiating means coupled to the output of the amplifying means, the differentiating means differentiating the amplified light sensor output signal and generating a differentiating means output signal in response thereto;

d) a comparator means being coupled to the output of the differentiating means and receiving the differentiating means output signal, the comparator means having a first and second preselected threshold value signal, the comparator means comparing the differentiating means output signal with the first and second preselected threshold value signals and generating a comparator means output signal in response to the comparison thereof, the comparator means output signal being in a first state when the differentiating means output signal is less than the first preselected threshold value signal, the comparator means output signal being in a second state when the differentiating means output signal is at least equal to the second preselected threshold value signal; and e) a monostable device coupled to the comparator and being responsive to the comparator output signal, the monostable device generating a first system output signal when the comparator output signal is in the first state, the monostable device generating a second system output signal when the comparator output signal is in the second state.

* * * * *